Sept. 12, 1950     J. B. ARMITAGE     2,522,206
TRANSMISSION CONTROL MECHANISM
Filed March 8, 1946     2 Sheets-Sheet 2
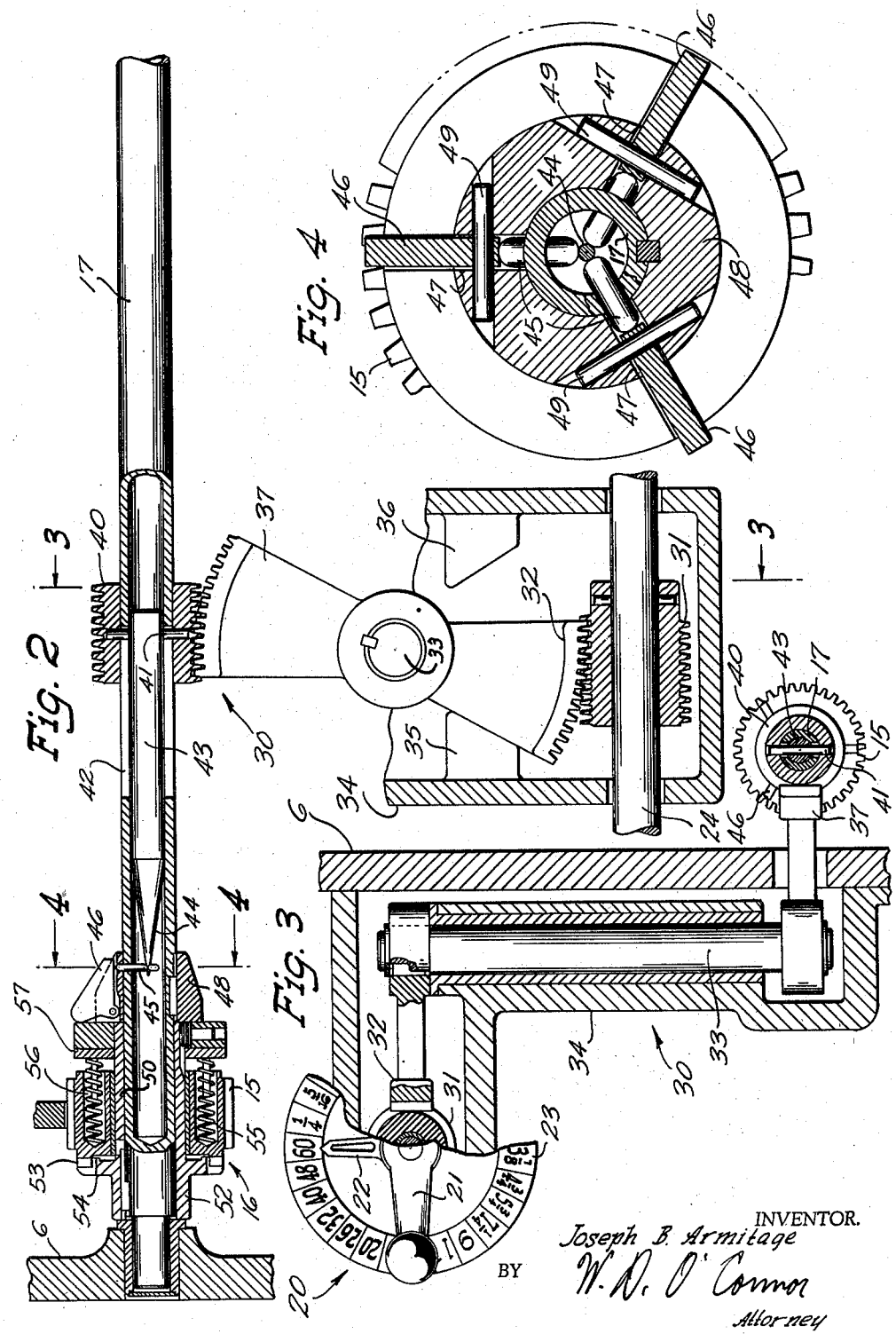
INVENTOR.
Joseph B. Armitage
BY W. N. O'Connor
Attorney Patented Sept. 12, 1950

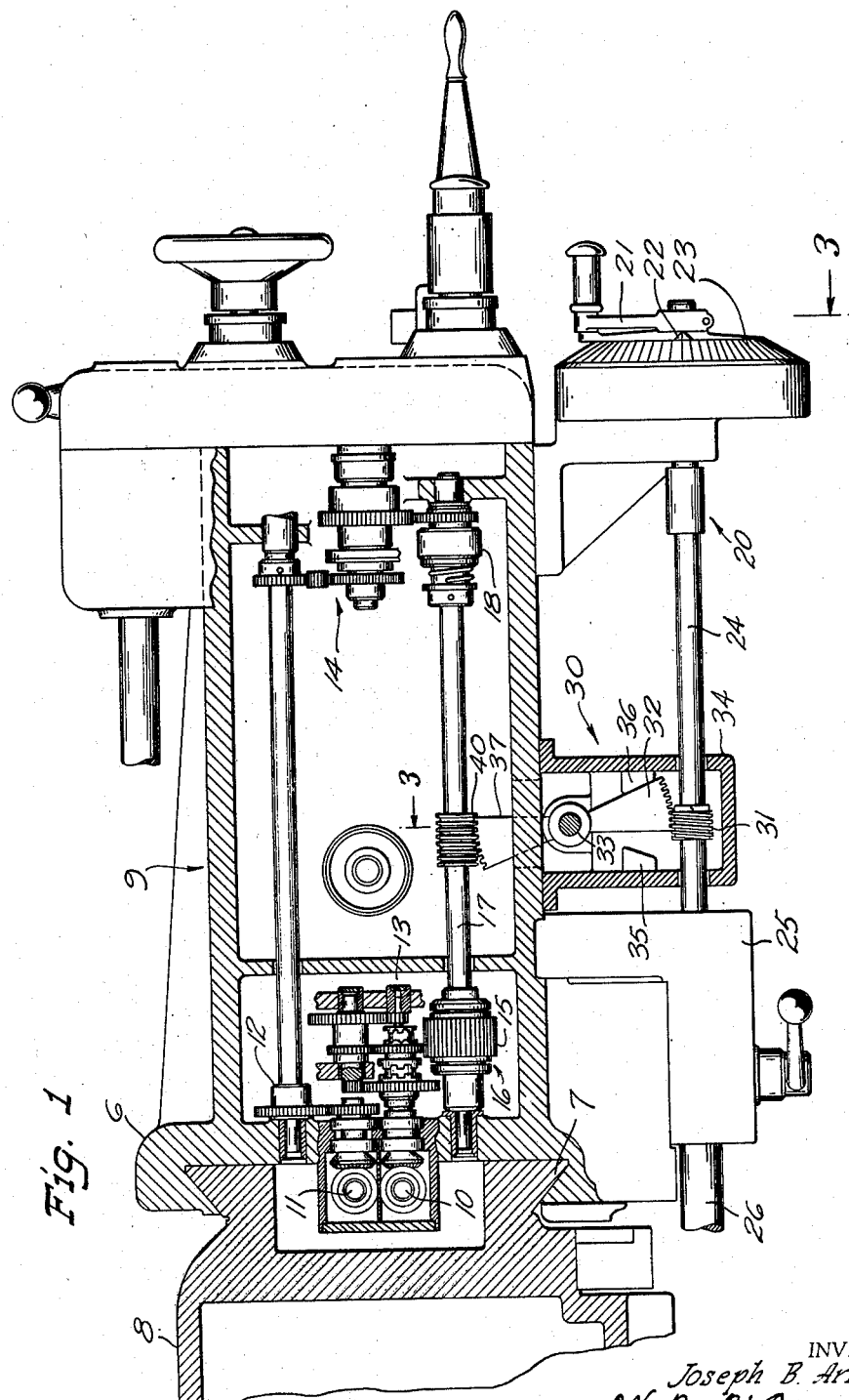

2,522,206

UNITED STATES PATENT OFFICE 2,522,206

TRANSMISSION CONTROL MECHANISM

Joseph B. Armitage, Wauwatosa, Wis., assignor to Kearney & Trecker Corporation, West Allis, Wis., a corporation of Wisconsin Application March 8, 1946, Serial No. 653,101

7 Claims. (Cl. 74—337)

This invention relates generally to machine tool transmission mechanisms and more particularly to control means for an overload clutch in a power transmitting train.

A general object of the invention is to provide an improved machine tool transmission mechanism.

Another object of the invention is to provide an improved control means for an overload clutch.

Another object of the invention is to provide a transmission with overload protective means capable of being adjusted to operate under varying overload conditions dependent upon the speed of the transmission.

Another object of the invention is to provide an overload protective means in a variable speed transmission with control means synchronized to effect a simultaneous speed change and an adjustment of the overload protective means.

According to this invention, a machine tool speed selecting transmission mechanism is provided with an overload clutch having a control mechanism operably interconnected with the transmission speed selection means to vary the overload capacity of the clutch in relation to the selected speed of the transmission. To this end, an adjustable overload safety clutch is operably connected between the driving and driven members of a variable speed transmission. A speed selection means which is connected to effect shifting of transmission gears to provide a desired speed of the driven member, is also connected to the safety clutch to effect a predetermined adjustment of the clutch corresponding to the speed rate of the transmission. Adjustment of the shiftable gearing and the overload clutch may be made while the transmission is operating.

The foregoing and other objects of this invention, which will become more fully apparent from the following detailed specification, may be achieved by the exemplifying structure depicted in and described in connection with the accompanying drawings, in which:

Figure 1 is a horizontal sectional view through a movable knee of a milling machine showing enclosed transmission mechanism including an adjustable overload safety clutch and control mechanism operating according to the teachings of the invention;

Fig. 2 is an enlarged fragmentary horizontal sectional view of the clutch and control means shown in Fig. 1;

Fig. 3 is a fragmentary detail view of the clutch control mechanism taken in vertical section on the planes represented by the lines 3—3 in Figs. 1 and 2; and Fig. 4 is a detail view of the clutch actuating mechanism, taken in vertical section along the line 4—4 in Fig. 2.

The exemplifying structure incorporating a preferred embodiment of the invention is a machine tool transmission mechanism such as the feed rate changing gearing contained within the movable knee of a milling machine of the type invented by Joseph B. Armitage and set forth and claimed in Patent No. 1,966,158.

Referring more particularly to the drawings and especially to Fig. 1 thereof, the milling machine embodying the invention is represented by a work carrying knee 6 that is slidably mounted for vertical movement on ways 7 on the front of a machine column 8 in the usual manner. A power transmission mechanism 9 operably contained within the knee 6 serves to provide means for effecting movement of the knee 6 along the column 8 and to actuate superimposed saddle and table assemblies (not shown) selectively at one of a plurality of feed rates in a manner fully described in the aforementioned patent.

Power for operating the transmission 9 is derived from a motor (not shown) mounted in the base of the column 8 and connected to drive a pair of splined shafts 10 and 11 journalled vertically in the column between the ways 7. The shaft 11 provides power for actuating a rapid traverse drive train 12 while the shaft 10 provides power for driving a fixed step rate changing feed gear train 13. Both drives connect with distribution gearing 14 disposed in the front of the knee 6 and connected selectively to the various movable work supporting elements in a well known manner. By shifting various gear couplets in the gear train 13 and in a primary gear train (not shown) contained in the column 8, a gear 15 meshing with a gear of the train 13 and a hollow driven shaft 17 that carries the gear 15 may be driven at any one of twenty-seven speeds. The shaft 17 connects with an overrunning clutch 18 and the distribution gears 14 at the front of the knee 6, which affords a driving connection for effecting movement of either the knee, saddle or table selectively at one of the twenty-seven feed rates, as more fully described in the aforementioned patent.

The various gear couplets in the two gear trains are predeterminately positioned to complete one of the plurality of driving trains by the operation of a feed selecting mechanism 20. As shown in Figs. 1 and 3, the mechanism 20 is disposed along the left side of the knee 6 with a feed selecting crank 21 operably mounted at the front of the knee arranged to effect relative movement between a pointer 22 and a circular dial plate 23 bearing feed rate indicia. The crank 21 is connected to rotate a shaft 24 extending rearwardly to a gear couplet shifting mechanism (not shown) contained in a case 25 bolted on the side of the knee 6. The gear shifting mechanism serves to shift the gears selectively through a series of interconnecting shifting forks (not shown) in the usual manner. The extending end of the shaft 24 is coupled to a shaft 26 connecting with another shifting mechanism (not shown) for the primary gear train contained in the column 3. Thus, the machine operator can readily select any one of the available feeds by rotating the crank 21 until the desired feed rate is indicated on the dial 23. When such a selection is made, the gear couplets in the transmissions will have been positioned to complete a gear train and provide a power drive to the knee, saddle and table at the desired feed rate.

An overload safety or disconnecting clutch means 16 is operably disposed between the gear 15 and the shaft 17 to protect the mechanism against overload. In the conventional type of transmission, the overload clutch 16 is preset to operate upon the occurrence of an overload of a single predetermined magnitude. Since the driving force imparted to the movable machine members varies for each of the twenty-seven feed rates at which these members may be driven, the effectiveness of the clutch varies with different conditions. At the lower feed rates (for example, the low setting of ¼" per minute on the dial 23), the power required to effect movement of a machine member is ordinarily comparatively low because of the mechanical advantage gained in the gear train, while at the higher feed rates (for example, 60" per minute), the mechanical advantage is greatly reduced and the power required to effect movement is increased proportionately. Other factors, such as the type of cutter, cutter speed, condition of the cutter and type of material being cut, also tend to affect the load placed on the clutch during any given cutting operation. Furthermore, when a workpiece carried by a driven machine member is initially fed into the cutters, an impact force is imparted to the driven members and the transmission, which may be of sufficient magnitude at certain feed rates to damage or break the driving mechanism.

According to the teaching of this invention, the safety clutch 16 is adjusted for each feed rate setting of the transmission to compensate for the variations in load forces incurred with the different feed rate settings. For this purpose, a safety clutch adjusting or control mechanism 30, as shown in Figs. 1, 2 and 3, is mounted on the left side of the knee 6 and connected to operate in unison with the feed selecting mechanism 20.

Whenever the crank 21 is rotated to effect a feed rate change, the shaft 24 and a worm 31 keyed thereto is rotated. The worm 31 engages with a gear segment 32 fixedly carried on the upper end of a vertical shaft 33 journalled in a housing 34 attached to the side of the knee 6, as shown in Figs. 1 and 3. Two extending lugs 35 and 36 in the housing 34 serve as positive stops for the gear segment 32 and determine the extreme limits of movement of the clutch adjusting mechanism 30 in either direction. Keyed to the lower end of the shaft 33 is a similar gear segment 37, which extends inwardly through an opening in the side of the knee.

The lower gear segment 37 meshes with a circular rack 40, slidably carried on the hollow transmission shaft 17. A pin 41 extending diametrically through the rack 40, passes through a slot 42 in the shaft 17, and engages a pilot or clutch actuating rod 43 within the hollow shaft 17, thereby serving to lock the rack 40 and the pilot rod 43 together. The slot 42 serves to permit unitary axial movement of the circular rack and the pilot rod relative to the shaft 17 and the circular rack permits actuation by the gear segment 37 without interfering with the rotative movements of the shaft 17. With this arrangement, the clutch 16 can be adjusted while the transmission is operating.

A cone shaped tip or cam 44 on the end of the pilot rod 43 serves to vary the degree of clutch adjustment. The inner ends of three pins 45 abut against the conical surface of the pilot rod tip 44 and are retained for endwise movement in three evenly spaced holes in the hollow shaft 17, as shown in Figs. 2 and 4.

Three bellcranks or pressure fingers 46 are operably mounted in equally spaced receiving slots 47 in a retaining collar 48 keyed on the shaft 17. Each of the bellcranks 46 is pivotally held in position on a pin 49 anchored in the collar 48, as best shown in Fig. 4. With one arm of each bellcrank 46 in alignment with and abutting the outer end of one of the three pins 45, axial movement of the pilot rod 43 will effect a simultaneous rocking movement of each of the three bellcranks 46.

Selective positioning of the bellcranks 46 serves to adjust the safety clutch 16 (see Fig. 2). The driving member of the clutch, which is integrally formed with the gear 15, is carried for axial movement on a sleeve bearing 50, which in turn, is carried on a tubular clutch member 52, keyed for rotation with the transmission shaft 17. Angular clutch teeth or cam surfaces 53 on the side face of the gear 15 cooperate with corresponding clutch teeth on a circular flange 54, integrally formed on the clutch member 52, to lock the two parts together for unitary rotation under specified operating conditions. The angular clutch teeth are retained in mesh under normal conditions through spring pressure exerted by a plurality of springs 55 socketed in retaining chambers 56 in the gear member 15 and abutting against a washer 57. This washer is supported for endwise movement by a spacer ring or collar 58 slidably keyed on the right end of the clutch member 52. Controlled endwise movement of the washer 57 and spacer 58, to vary the effect of the springs 55 upon clutch overload operation, is effected through their engagement with the other arm of each of the three bellcranks 46.

Thus, when the feed selecting mechanism 20 is moved to a high feed rate position, for example, sixty inches per minute, as shown on the dial 20 in Fig. 3, the clutch adjusting mechanism 30 will be operated to advance the circular rack 40 rightwardly, as shown in Fig. 2, until the clutch springs 55 are relaxed to their state of minimum compression. If at that time the feed train 13 is power driven, the gear 15 will rotate at a fast speed. The occurrence of an overload will cause the gear 15 in the safety clutch 16 to shift rightwardly from the position shown in Fig. 2 until the angular clutch teeth 53 are disengaged from the clutch teeth 54 in the clutch member 52. Since the clutch springs 55 are then adjusted for a minimum compression, a comparatively light impact force occurring as a result of the overload will effect disengaging movement of the gear member 15. As the potential impact force is increased for each successive increase in feed rate, the clutch 16 is, in each instance, adjusted to operate at correspondingly lower overloads to compensate for the impact force variations. Thus, the transmission mechanism will be able to relieve the full load of the impact forces resulting from the greater inertia of the movable members and the associated driving mechanism. In this manner, damage to the driving mechanism particularly at the higher feed rates, which might otherwise occur, will be eliminated.

When a low feed rate is desired such, for example, as ¼" per minute, the clutch adjusting mechanism 30 may be moved to the position shown in Fig. 1. The circular rack 40 and pilot rod 43 will then be moved to the extreme left-hand position to compress the springs 55 and render them most effective. At this time, the power required to drive the machine members at a selected driving force is at a minimum. Consequently, the clutch 16 is set to withstand a greater impact force before slipping, since the driving mechanism, at the lower feed rates, is able to bear the higher impact forces without damaging any of the gearing or shafting in the transmission. Thus, if the safety clutch 16 is being power driven at this time to transmit power to the shaft 17, the occurrence of an overload will cause the gear 15 to move rightwardly, as aforementioned, until the angular clutch teeth 53 thereon are disengaged from the clutch teeth 54 on the member 52 to interrupt the driving train until such a time as the overloaded condition is relieved. Since the clutch springs 55 are then adjusted to withstand a greater impact force before allowing a slippage of the clutch, a greater overload force must occur before the safety clutch 16 will operate.

For each feed rate setting between these extremes, the clutch 16 will be automatically adjusted to proportionately compensate for any variation or change in the potential impact force between settings. Thus, at any feed rate setting, the clutch 16 will be rendered operative upon the occurrence of an overload exerting a predetermined force which differs from the force required to render the clutch operative at any of the other feed rate settings. Although the cam 44 in the illustrated disclosure is conically shaped to provide a clutch adjustment wherein a great impact force is necessary to overload the clutch at the lower feed rates, it will be apparent to one skilled in the art that the shape of the cam 44 may be varied to provide any desired clutch adjustment for a selected feed rate setting in the feed transmission 13. Thus, the clutch 16 may be designed to meet any special varying overload requirement. It will also be apparent to one mechanically inclined, that variations may be made in the apparatus for effecting the movement of the pilot rod 43 within the hollow shaft 17 to adjust the clutch simultaneously with the adjustment of the gearing in the transmission 13.

From the foregoing description of a preferred apparatus for adjusting a clutch simultaneously with the shifting of gearing in a transmission, it is apparent that this invention provides an improved transmission mechanism particularly adapted to vary the capacity of an overload clutch.

Although the mechanism shown in the drawings has been described in detail for the purpose of fully setting forth practical apparatus embodying the invention, it is to be understood that the structure herein described is intended to be illustrative only and that the various novel features of the invention may be incorporated in other structural forms without departing from the spirit and scope of the subjoined claims.

The spirit of the invention having now been fully explained in connection with the foregoing description of the illustrative embodying apparatus, the invention is hereby claimed as follows:

1. A variable speed transmission including overload means to protect said transmission upon the occurrence of an excessive load and comprising a power source, a shiftable gear train driven from said source to provide a variety of output speeds from said transmission, an overload mechanism in said gear train, pressure finger means to adjustably vary the effective force necessary to render the said mechanism sensitive to overload and control means to operate said finger means simultaneously with gear shifting in said train to vary the output speed from said transmission.

2. A transmission overload and control means comprising an overload mechanism operably connected to disconnect the power drive to said transmission upon the occurrence of an overload, a speed control means for said transmission, and interconnecting means between said control means and said overload mechanism whereby the force necessary to render said overload mechanism operative is predeterminately varied with the speed rate of said transmission.

3. In a machine tool having a frame, a supporting member movably mounted on said frame, power driven transmission mechanism operatively connected to actuate said supporting member, said mechanism including an adjustable rate changer and an adjustable overload release device, and control mechanism operatively connected to effect correlated adjustment of said rate changer and said overload release device, whereby said overload release device is adjusted automatically to conform with the conditions established through adjustment of said rate changer.

4. In a machine tool having a frame, a supporting member movably mounted on said frame, power actuated mechanism for driving said supporting member, a speed changing power transmitting mechanism operatively connecting said power actuated mechanism to said supporting member, an adjustable overload releasing mechanism associated with said power transmitting mechanism and operative to disengage said driving connection upon the occurrence of an overload, control mechanism operatively connected to effect adjustment of said speed changing mechanism, and means operated by said control mechanism and connected to adjust said adjustable overload releasing mechanism in conjunction therewith.

5. In a milling machine, a base, a work table movably mounted on said base, a source of power for actuating said table, a speed changing shiftable gear mechanism connected to be driven by said power source, an adjustable torque limiting apparatus driven by said speed changing mechanism and connected to drive said table, shifting mechanism operatively connected to shift said speed changing gear mechanism, and control mechanism arranged to be actuated by said shifting mechanism and operative to adjust said torque limiting apparatus in conjunction with shifting of said gearing, whereby said torque limiting apparatus may be adjusted automatically to provide the required degree of protection against excessive force acting upon said table regardless of its rate of operation.

6. In a machine tool having a variable speed transmission, a power input shaft to said transmission, a selectively variable gear train in said transmission connected to said shaft, a power output shaft driven from said gear train, an adjustable overload mechanism connected in said gear train to automatically disconnect the power drive to said transmission upon the occurrence of an overload on said output shaft, a control means to selectively vary the position of gears in said gear train and interconnecting means between said control means and said overload mechanism whereby said mechanism is simultaneously adjusted for each speed selection available through said gear train.

7. An overload safety mechanism adapted for utilization in the drive train of a transmission comprising a driving member, an intermediate member geared to be driven by said driving member and having a plurality of clutch teeth and a plurality of retaining chambers, a driven member concentrically disposed relative to said intermediate member and having a plurality of clutch teeth disposed to engage with said teeth on said intermediate member, a plurality of springs in the retaining chambers of said intermediate member, a retaining washer mounted on said driven member and adapted to engage said springs, a pressure finger assembly disposed to operatively engage said washer, a pilot cam concentrically disposed in said driven member to operatively engage said pressure fingers, an adjusting mechanism disposed to axially shift said pilot cam within said driven member, and a dial means connected with said adjusting mechanism whereby the setting of said overload safety mechanism may be readily ascertained and said adjusting mechanism may be readily manipulated while said overload mechanism is operatively driven by said driving member.

JOSEPH B. ARMITAGE.

REFERENCES CITED

The following references are of record in the file of this patent:

UNITED STATES PATENTS

| Number | Name | Date |
| --- | --- | --- |
| 1,197,917 | Dawson et al. | Sept. 12, 1916 |
| 2,123,744 | Ramsey | July 12, 1938 |
| 2,157,574 | Siesel | May 9, 1939 |
| 2,214,901 | Griffin | Sept. 17, 1940 |
| 2,459,976 | Vancil et al. | Jan. 25, 1949 |

FOREIGN PATENTS

| Number | Country | Date |
| --- | --- | --- |
| 364,758 | Germany | Dec. 1, 1922 |